US012746664B2

(12) United States Patent
Ito

(10) Patent No.: US 12,746,664 B2
(45) Date of Patent: Sep. 29, 2026

(54) ROBOT CONTROL DEVICE AND ROBOT SYSTEM

(71) Applicant: FANUC CORPORATION, Minamitsuru-gun (JP)

(72) Inventor: Naoki Ito, Yamanashi (JP)

(73) Assignee: FANUC CORPORATION, Minamitsuru-gun (JP)

( * ) Notice: Subject to any disclaimer, the term of this patent is extended or adjusted under 35 U.S.C. 154(b) by 176 days.

(21) Appl. No.: 18/728,815

(22) PCT Filed: Feb. 24, 2022

(86) PCT No.: PCT/JP2022/007585
§ 371 (c)(1),
(2) Date: Jul. 12, 2024

(87) PCT Pub. No.: WO2023/162084
PCT Pub. Date: Aug. 31, 2023

(65) Prior Publication Data

US 2026/0183945 A1 Jul. 2, 2026

(51) Int. Cl.
*B25J 9/16* (2006.01)
*B25J 11/00* (2006.01)
(Continued)

(52) U.S. Cl.
CPC ........... *B25J 9/1638* (2013.01); *B25J 11/005* (2013.01); *B25J 13/085* (2013.01); *B25J 15/0483* (2013.01)

(58) Field of Classification Search
CPC ...... B25J 9/1638; B25J 11/005; B25J 13/085; B25J 15/0483; B25J 9/1633; G05B 19/423
See application file for complete search history.

(56) References Cited

U.S. PATENT DOCUMENTS

2006/0192514 A1* 8/2006 Adachi ............... H10P 72/0606 318/568.13
2015/0323398 A1* 11/2015 Lauzier .................... B25J 9/163 901/30

(Continued)

FOREIGN PATENT DOCUMENTS

CN 211787631 U * 10/2020
DE 69622572 T2 4/2003

(Continued)

OTHER PUBLICATIONS

International Search Report and Written Opinion (ISRWO) corresponding to counterpart International Patent Application PCT/JP2022/007585 mailed May 17, 2022, English translation.

*Primary Examiner* — Abby Lin
*Assistant Examiner* — Danielle M Jackson
(74) *Attorney, Agent, or Firm* — Renner, Otto, Boisselle & Sklar, LLP

(57) ABSTRACT

This robot control device capable of controlling a robot according to a lead-through control in which the orientation of the robot is varied in accordance with the magnitude and the direction of forces detected by a force sensor provided in the robot, wherein the robot control device: identifies a first state in which an additional device is installed at a distal end of a wrist of the robot, and a second state in which the additional device is not installed at said location; and switches a load setting of the robot when the lead-through control is executed in the first and second states.

6 Claims, 4 Drawing Sheets

(51) Int. Cl.
*B25J 13/08* (2006.01)
*B25J 15/04* (2006.01)

(56) References Cited

U.S. PATENT DOCUMENTS

| | | | | |
|---|---|---|---|---|
| 2017/0312917 | A1* | 11/2017 | Chung | G05B 19/423 |
| 2020/0156262 | A1* | 5/2020 | Yamamoto | B25J 15/0483 |
| 2023/0226682 | A1* | 7/2023 | Beard, III | B25J 9/1664 700/257 |
| 2023/0278224 | A1* | 9/2023 | Bunker | B25J 11/005 700/254 |
| 2024/0001473 | A1 | 1/2024 | Motokado et al. | |
| 2024/0009858 | A1 | 1/2024 | Inoue et al. | |

FOREIGN PATENT DOCUMENTS

| | | | | |
|---|---|---|---|---|
| DE | 102018107231 | A1 | | 10/2018 |
| DE | 102015004426 | B4 | | 1/2019 |
| JP | S63-318277 | A | | 12/1988 |
| JP | H01234185 | A | | 9/1989 |
| JP | H07-299702 | A | | 11/1995 |
| JP | H09-091004 | A | | 4/1997 |
| JP | H09-150383 | A | | 6/1997 |
| JP | H09-155547 | A | | 6/1997 |
| JP | 2008272814 | A | * | 11/2008 |
| JP | 2019-034412 | A | | 3/2019 |
| WO | 2021-261426 | A1 | | 12/2021 |
| WO | 2022-196543 | A1 | | 9/2022 |

* cited by examiner

ROBOT CONTROL DEVICE AND ROBOT SYSTEM

RELATED APPLICATION DATA

This application is a national phase of International Application No. PCT/JP2022/007585 filed Feb. 24, 2022, which is incorporated herein by reference in its entirety.

TECHNICAL FIELD

The present disclosure relates to a robot control device and a robot system.

BACKGROUND ART

In the related art, there is a known technology wherein a detection device that detects a welding line is attachable to and detachable from a tool, such as a welding torch, to increase a detection area of the detection device, and thus, interference with other members is eliminated (for example, see Patent Literature 1). In addition, there is a known robot that has a built-in sensor that detects force applied by an operator and that can perform motions according to so-called lead-through control in which the position and the orientation of the robot are varied in accordance with the magnitude and the direction of the force detected by the sensor (for example, see Patent Literature 2).

Citation List

Patent Literature

{PTL 1} Japanese Unexamined Patent Application, Publication No. Hei 7-299702

{PTL 2} Japanese Unexamined Patent Application, Publication No. 2019-34412

SUMMARY OF INVENTION

It is a robot control device capable of controlling a robot according to a lead-through control in which an orientation of the robot is varied in accordance with magnitude and a direction of force detected by a force sensor provided in the robot, wherein the robot control device: identifies a first state in which an additional device is installed at a distal end of a wrist of the robot, and a second state in which the additional device is not installed; and switches a load setting of the robot when the lead-through control is executed in the first and second states.

DESCRIPTION OF EMBODIMENT

A robot control device 3 and a robot system 1 according to an embodiment of the present disclosure will be described below with reference to the drawings.

Figure 1:
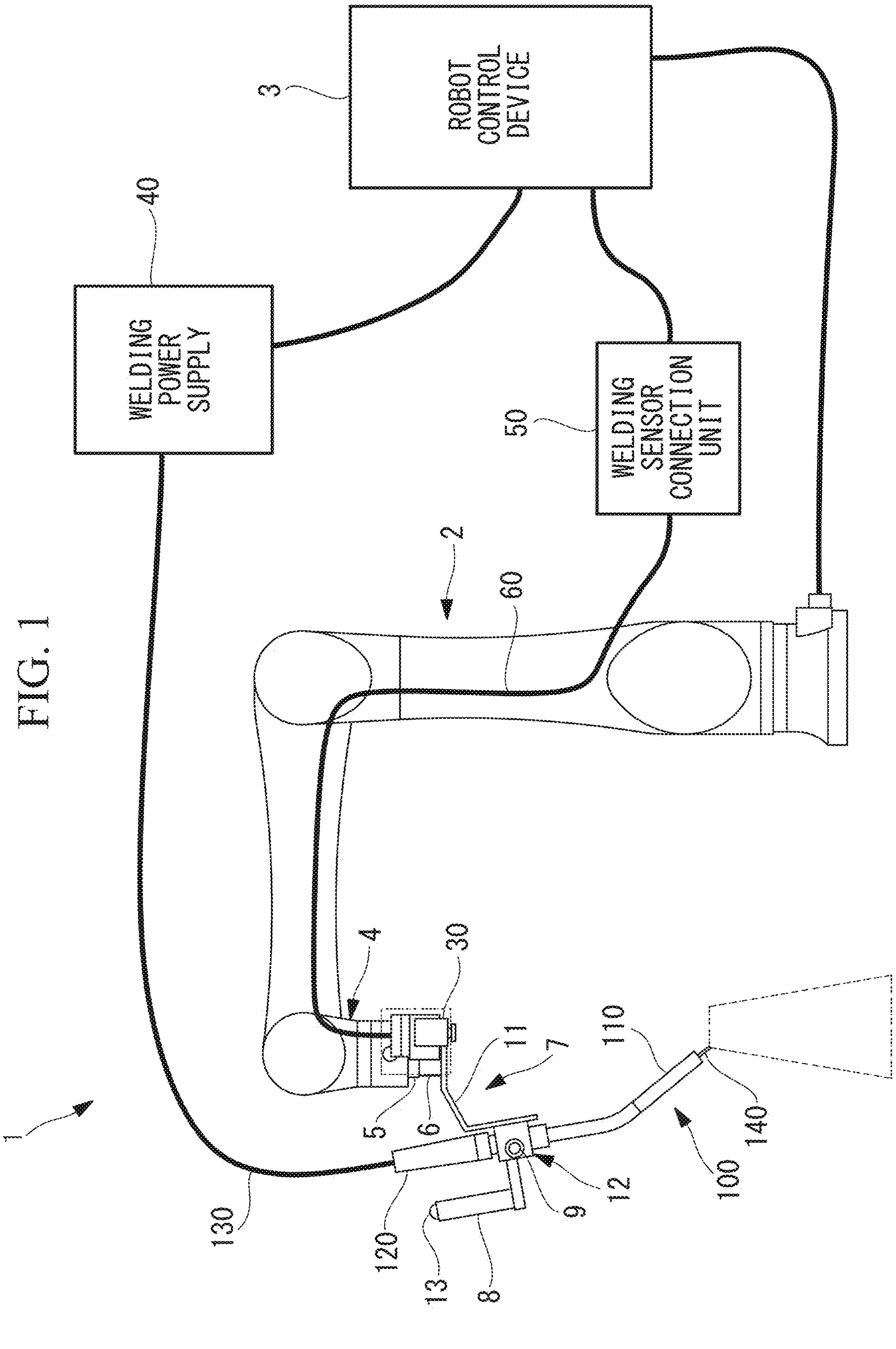
FIG. 1 FIG. 1 is an overall configuration diagram showing a robot system according to an embodiment of the present disclosure.

As shown in FIG. 1, the robot system 1 according to this embodiment includes: a robot 2 that includes a force sensor 10; and the robot control device 3 that controls the robot 2.

A wrist 4 of the robot 2 includes, at a distal end thereof, a flange 5 that can be rotated about a rotation axis X at a foremost end of the wrist 4 and a tool bracket 6 is secured to the flange 5. In addition, a torch bracket 7 that supports an elongated tool, such as a welding torch 100, is secured to the tool bracket 6 and the torch bracket 7 includes two handles 8 and 9 that are gripped by an operator.

The torch bracket 7 includes: a bracket body 11 secured to the tool bracket 6; and a securing block 12 that secures the welding torch 100 to the bracket body 11 and to which the handles 8 and 9 are secured.

The welding torch 100 includes: a tube-like torch body 110 that is bent in one direction; a substantially columnar neck holder 120 that is connected to a basal end of the torch body 110; and a guide tube 130 that is connected to a basal end of the neck holder 120.

The guide tube 130, the neck holder 120, and the torch body 110 include inner holes (not shown) through which a welding wire 140 passes in a longitudinal direction. In the welding torch 100, the welding wire 140 that has passed through the inner holes is made to protrude from a distal end of the torch body 110, an arc is generated between the welding wire 140 and a workpiece, and thus, the workpiece is welded.

Because the welding torch 100 has the elongated form, as indicated above, the welding torch 100 cannot be made to pass through the interior of the wrist 4 and is supported by the torch bracket 7 at an eccentric position with respect to the rotation axis X of the flange 5. Also, the torch body 110 is disposed in a form in which the torch body 110 is bent along a plane (hereinafter referred to as the tool plane) P containing the rotation axis X of the flange 5 from the position at which the torch body 110 is secured to the torch bracket 7, and the welding wire 140 is made to protrude at a position at which the welding wire 140 intersects the rotation axis X of the flange 5. The intersection between the rotation axis X of the flange 5 and the welding wire 140 is generally set as a tool distal end point.

The handles 8 and 9 are: the first handle 8 disposed along the tool plane P; and the second handle 9 disposed so as to extend along a direction orthogonal to the tool plane P at a position in the proximity of a longitudinal axis Y of the welding torch 100.

The first handle 8 is a straight rod-like member that can be gripped by the operator with his/her right hand. The first handle 8 is disposed in parallel to the longitudinal axis Y of the welding torch 100 with a large enough spacing to insert the four fingers other than the thumb of the right hand between the welding torch 100 and the handle. Accordingly, the first handle 8 is disposed in the form of extending in the tool plane P in the direction along the longitudinal axis Y of the welding torch 100.

At a distal end of the first handle 8, a lead-through switch 13 that can be operated with the thumb of the right hand in a state in which the first handle 8 is gripped is provided. The lead-through switch 13 activates lead-through control in a state in which a pressing force of the thumb is applied thereto and deactivates the lead-through control in a state in which the pressing force is released.

The second handle 9 is a straight rod-like member that is disposed at a position at which the operator gripping the first handle 8 with his/her right hand can grip the second handle 9 with his/her left hand. In the securing block 12, two pressing button switches 14 and 15 are provided at positions at which the switches can be operated with the thumb of the left hand in a state in which the second handle 9 is gripped in the overhand grip.

The pressing button switch 14 is a teaching button that stores, by being pressed, angles of individual axes of the robot 2 at the time of being pressed. The pressing button switch 15 is a mode switching button that switches, each time the switch is pressed, the motion mode of the robot 2 between an orthogonal motion and the individual axis motions.

Figure 3:
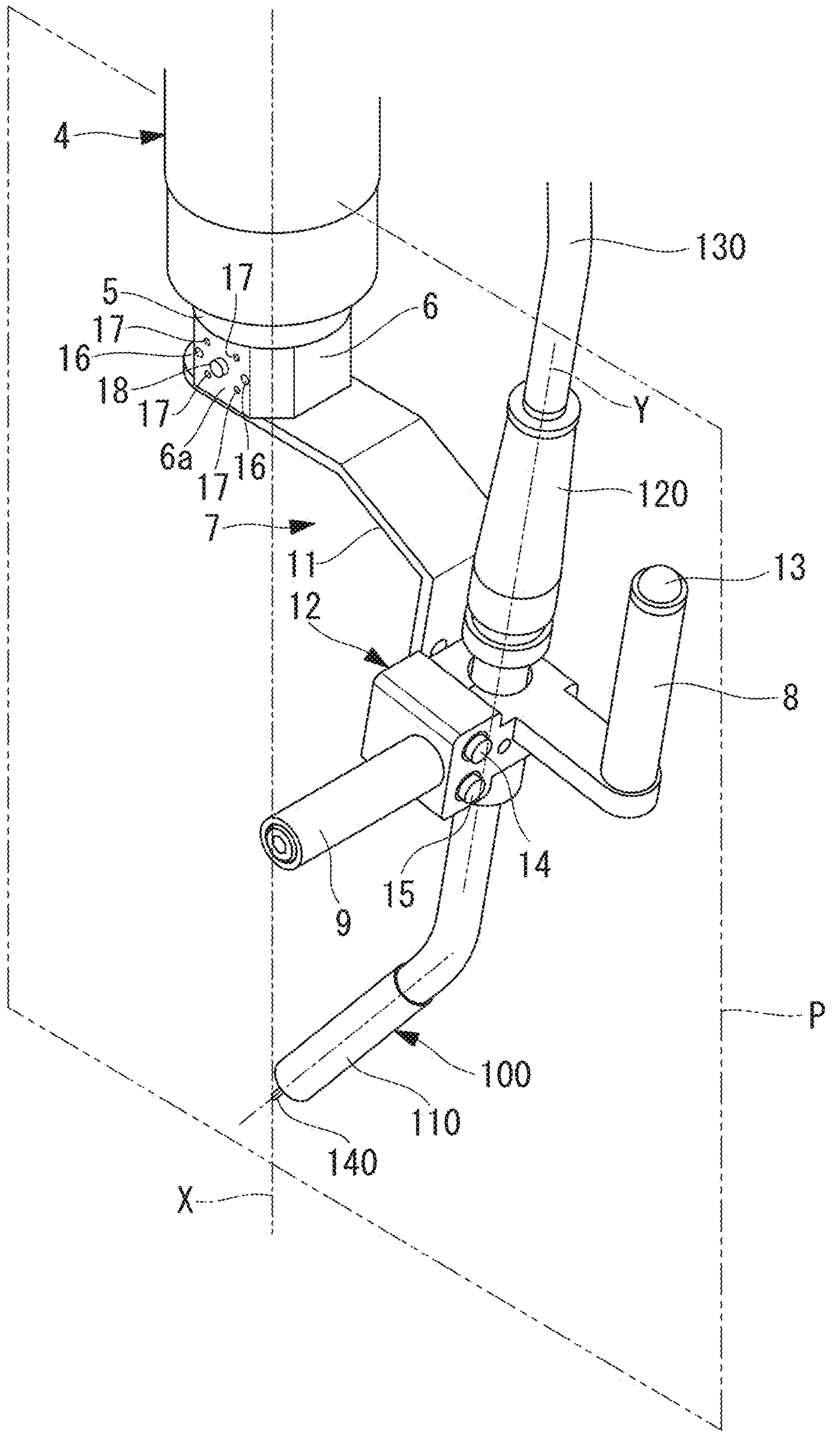
FIG. 3 FIG. 3 is a partial perspective view of a welding torch, a torch bracket, a handle, and a tool bracket attached to a distal end of a wrist of the robot of the robot system in FIG. 1.

The tool bracket 6 is a cuboid block-like member sandwiched between the flange 5 and the torch bracket 7. The bracket body 11 of the torch bracket 7 is secured to a distal end surface that is parallel to the flange 5 of the tool bracket 6. In addition, as shown in FIG. 3, sensor attaching surfaces (attaching surfaces) 6*a* for attaching a welding sensor (additional device) 30 in an attachable/detachable manner are provided on three side surfaces of the tool bracket 6 that are parallel to the rotation axis X of the flange 5. FIG. 3 only shows one sensor attaching surface 6*a*.

The welding sensor 30 is capable of precisely detecting a welding work line by detecting reflected light by scanning, for example, with respect to a workpiece, laser light in a direction intersecting the welding work line on the workpiece.

The sensor attaching surfaces 6*a* are provided in the three side surfaces of the tool bracket 6, for example, at three locations corresponding to two side surfaces on the left and right sides and a side surface on the back side when the tool bracket 6 is viewed from the torch bracket 7 side.

The operator can select a sensor attaching surface 6*a* in accordance with the scanning direction of the laser light and the position of a processing work line with respect to the welding torch 100 and attach the welding sensor 30 thereto. Each of the sensor attaching surfaces 6*a* is provided with two pin holes 16 and four screw holes 17 and the welding sensor 30 can be attached in a state of being precisely positioned with respect to the robot 2 by means of bolts and positioning pins.

In addition, each of the sensor attaching surfaces 6*a* is provided with a switch (attachment/detachment sensor) 18 that is pressed as a result of the welding sensor 30 being attached thereto. A sensor attaching surface 6*a* to which the welding sensor 30 is attached can be detected by means of the state of the switch 18 provided on the sensor attaching surface 6*a* serving as the attachment destination.

Figure 2:
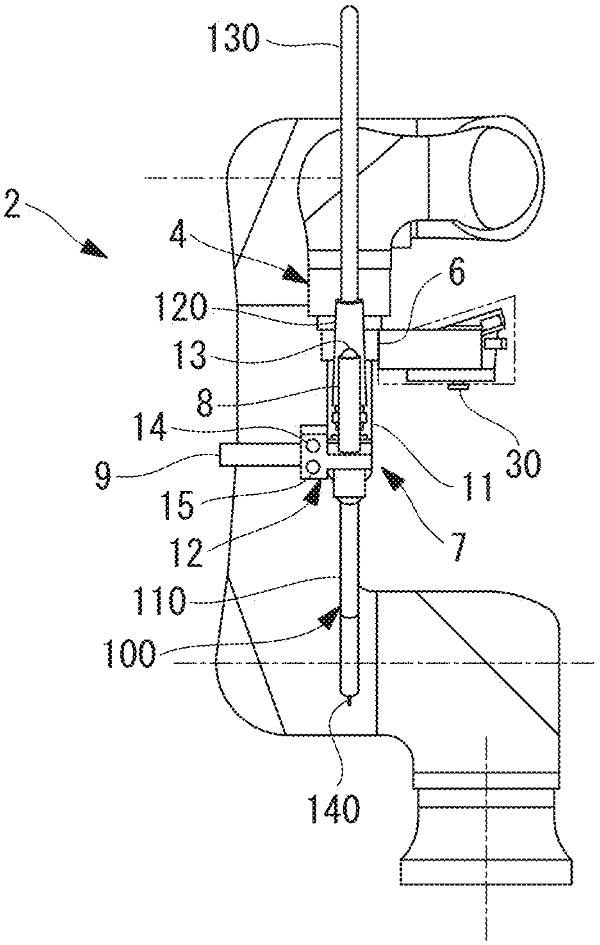
FIG. 2 FIG. 2 is a front view of a robot included in the robot system in FIG. 1.

In the example shown in FIGS. 1 and 2, the welding sensor 30 is secured to the sensor attaching surface 6*a* in the side surface on the right side viewed from the torch bracket 7 side. The welding sensor 30 has a relatively large external shape and is disposed so as to protrude from the sensor attaching surface 6*a* by a relatively large amount.

Figure 4:
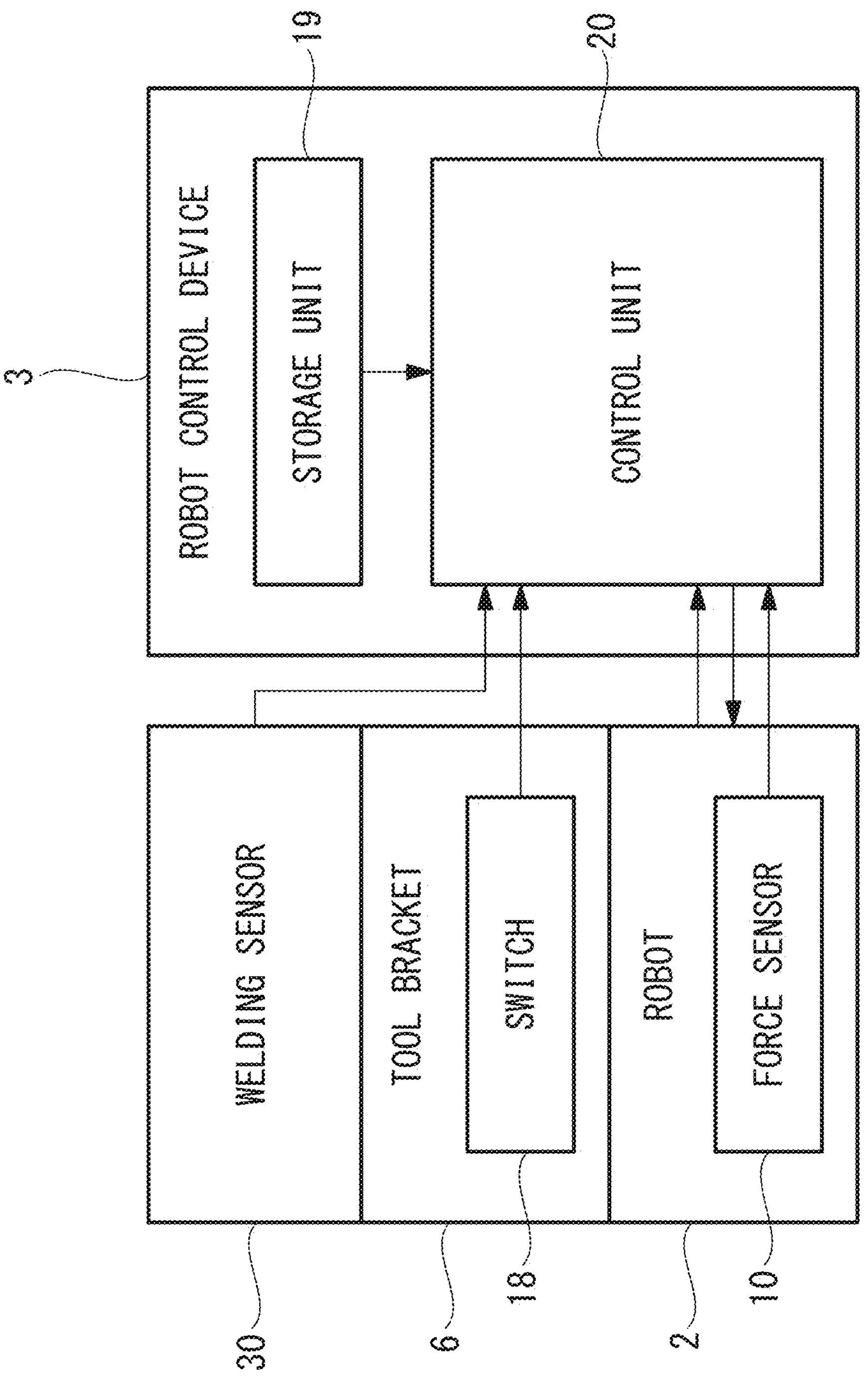
FIG. 4 FIG. 4 is a block diagram showing the robot system in FIG. 1.

As shown in FIG. 4, the robot control device 3 includes a storage unit 19 and a control unit 20.

The control unit 20 includes at least one processor and a memory.

The control unit 20 outputs instruction signals so as to control the robot 2 according to a so-called lead-through control in which the orientation of the robot 2 is varied in accordance with the magnitude and the direction of force detected by the force sensor 10 included in the robot 2.

As shown in FIG. 1, a welding power supply 40 is connected to the robot control device 3 and the welding power supply 40 and the welding torch 100 are connected by means of the guide tube 130. In addition, a welding sensor connection unit 50 is connected to the robot control device 3 and a sensor control cable 60 to be connected to the welding sensor 30 is connected to the welding sensor connection unit 50.

In a state (second state) in which the welding sensor 30 is not attached to any of the sensor attaching surfaces 6*a* and the welding torch 100 is attached by means of the torch bracket 7, the robot control device 3 stores load information detected by the force sensor 10 in the storage unit 19. As the load information, for example, values detected by the force sensor 10 when angles of the individual axes of the robot 2 are disposed at origin positions are stored.

When the angles of the individual axes (individual-axis information) of the robot 2 change, the values detected by the force sensor 10 change; however, the control unit 20 can estimate the magnitude and the direction for the force detected by the force sensor 10 from the individual-axis information of the robot 2 and the load information stored in the storage unit 19. Therefore, in the second state in which all of the switches 18 do not detect the attachment of the welding sensor 30, the control unit 20 can handle the state as a neutral load state (load setting) in which no external force is acting, regardless of the angles of the individual axes so long as the estimated values are detected by the force sensor 10.

In addition, the robot control device 3 stores, in the storage unit 19, information about the mass of the welding sensor 30 and the position of the center of gravity thereof from the sensor attaching surface 6*a*, which is the basic information of the welding sensor 30.

Also, in the case in which the attachment of the welding sensor 30 to one of the sensor attaching surfaces 6*a* is detected by the switch 18 thereof, the control unit 20 changes the neutral load state.

Specifically, in the state (first state) in which the welding sensor 30 is attached, the mass of the welding sensor 30 stored in the storage unit 19 is added at the position separated, by the position of the center of gravity stored in the storage unit 19, from the sensor attaching surface 6*a* in which the attachment is detected. Therefore, in the case in which the first state is detected, the control unit 20 estimates the load information detected by the force sensor 10 from the mass and the position of the center of gravity stored in the storage unit 19 and the individual-axis information of the robot 2 and sets the estimated load information as a new neutral load state.

In addition, in the case in which the welding sensor 30 detects a welding work line, the control unit 20 corrects a taught teach point on the basis of features of the detected welding work line. Specifically, in the case in which the position coordinates of a distal end of the welding wire 140 protruding at the distal end of the welding torch 100 are set as a teach point, if the teach point is displaced from the welding work line detected by the welding sensor 30, the coordinates of the teach point are corrected so as to be disposed on the welding work line.

The operation of the thus-configured robot control device 3 and robot system 1 according to this embodiment will be described below.

In order to perform teaching of welding work by employing the robot system 1 according to this embodiment, the operator first grips the first handle 8 and the second handle 9 of the torch bracket 7 in the second state in which the welding sensor 30 is not attached to any of the sensor attaching surfaces 6*a*.

Then, the lead-through control is activated by pressing down the lead-through switch 13 provided in the first handle 8. Accordingly, the robot control device 3 causes the robot 2 to perform motions by means of the lead-through control on the basis of force applied to the first handle 8 and the second handle 9.

In this second state, the switch 18 provided on the sensor attaching surface 6*a* is in the OFF state; therefore, the robot control device 3 uses the detection values of the force sensor 10 in the neutral load state that are stored in the storage unit 19 as references. Then, because the magnitude and the direction of force detected by the force sensor 10 change as a result of the operator applying forces to the first handle 8 and the second handle 9, the robot control device 3 causes the robot 2 to perform motions according to the lead-through control on the basis of the change amounts.

As a result of the operator pressing down the pressing button switch 14 which is one of the teaching buttons provided in the vicinity of the second handle 9, in a state in which the robot 2 is disposed in a desired orientation, the angles of the individual axes of the robot 2 at the time at which the button is pressed down are stored. By repeating this motion, it is possible to teach a motion program of the robot 2.

In the teaching operation in the second state in which the welding sensor 30 is not attached, it is possible to teach teach points that can be relatively roughly set, such as a start point, relay points, etc. of the motion program. In addition, because the welding sensor 30 having a relatively large size is not secured to the tool bracket 6, it is possible to easily perform the teaching operation even in a relatively narrow environment without a concern for interference between the welding sensor 30 and a peripheral member.

Next, in order to teach teach points that require precise teaching, such as a welding work line, the operator attaches the welding sensor 30 to one of the sensor attaching surfaces 6*a*. Upon the welding sensor 30 being attached, the switch 18 in the sensor attaching surface 6*a* to which the welding sensor 30 is attached is switched to the ON state. Upon the switch 18 being switched to the ON state, the control unit 20 changes the neutral load state by employing the mass and the position of the center of gravity of the welding sensor 30 stored in the storage unit 19.

Specifically, upon the welding sensor 30 being attached to the sensor attaching surface 6*a*, the magnitude and the direction of force detected by the force sensor 10 change before and after the attachment; however, the robot control device 3 is capable of determining that the first state in which the welding sensor 30 is attached is the neutral load state. Therefore, when the operator grips and applies forces to the first handle 8 and the second handle 9 in this first state, the robot control device 3 causes the robot 2 to move to desired positions by means of the lead-through control, and thus, it is possible to teach a plurality of teach points along a welding work line.

After the plurality of teach points along the welding work line are taught, as a result of the operator activating the welding sensor 30 and reproducing the teach points taught along the welding work line, features of the welding work line are detected by scanning laser light by means of the welding sensor 30 while causing the robot 2 to perform the motions. Upon the features of the welding work line detected by the welding sensor 30 being input, the control unit 20 corrects the coordinates of the individual teach points on the basis of the input features so that a tool distal end point at a distal end of the welding torch 100 is precisely aligned with the position of the welding work line.

After the teaching of the teach points along the welding work line is completed, the operator removes the welding sensor 30 from the sensor attaching surface 6*a* and performs teaching of the remaining teach points while causing the robot 2 to perform motions by means of the lead-through control. In this case also, the switch 18 is put to the OFF state and the second state is detected as a result of the welding sensor 30 being removed from the sensor attaching surface 6*a*; therefore, the control unit 20 restores the neutral load state to the load state stored in the storage unit 19. Accordingly, it is possible to precisely detect, by means of the force sensor 10, the magnitude and the direction of the forces applied to the first handle 8 and the second handle 9 by the operator and to cause the robot 2 to move to a desired orientation.

As has been described above, with the robot control device 3 and the robot system 1 according to this embodiment, the robot control device 3 identifies the first state in which the welding sensor 30 is attached to the sensor attaching surface 6*a* and the second state in which the welding sensor 30 is not attached and switches the load setting when the lead-through control is executed in the two states. Accordingly, regardless of whether or not the welding sensor 30 having relatively large weight and large external shape is attached, it is possible to cause the robot 2 to move to a desired orientation by correctly performing the lead-through control.

Specifically, as a result of performing the teaching in the second state in which the welding sensor 30 is removed at teach points that do not require the welding sensor 30, there is an advantage in that it is possible to perform the teaching without a concern for interference with a peripheral device. In addition, in the case in which the teaching is performed in the first state in which the welding sensor 30 is attached, it is also possible to correctly perform the lead-through control of the robot 2 regardless of force acting on the force sensor 10 due to the welding sensor 30. Also, there is an advantage in that it is possible to precisely correct the teach points along the welding work line by detecting the features of the welding work line by means of the welding sensor 30.

In addition, in this embodiment, because the plurality of sensor attaching surfaces 6*a* are provided in the tool bracket 6, it is possible to change the attaching position of the welding sensor 30 in accordance with the usage. Thus, there is an advantage in that, regardless of to which one of the sensor attaching surfaces 6*a* the welding sensor 30 is attached, it is possible to detect the attaching position of the welding sensor 30 by means of the switch 18 provided on each of the sensor attaching surfaces 6*a* and it is possible to correctly change the neutral load state.

Note that, in this embodiment, the attachment of the welding sensor 30 to the sensor attaching surface 6*a* is detected by means of the switch 18 that is physically pressed by the welding sensor 30; however, alternatively, other forms of attachment/detachment sensors, for example, a proximity sensor, such as a hall element, may be employed.

In addition, instead of employing an attachment/detachment sensor, the first state and the second state may be identified on the basis of information about force detected by the force sensor 10 in the first state and information about force detected by the force sensor 10 in the second state.

For example, the first state and the second state may be identified by disposing the robot 2 at an origin position in the first state and the second state and by comparing the magnitude and the direction of force detected by the force sensor 10 when other external forces are not applied. In addition, the attaching position of the welding sensor 30 may be detected on the basis of the magnitude and the direction of force detected by the force sensor 10 and the neutral load state may be changed on the basis of the detected attaching position.

In addition, when attaching the welding sensor 30, signals output from the welding sensor 30 are taken into the robot control device 3 by connecting the sensor control cable 60 to the welding sensor 30. Therefore, instead of detecting the attachment/detachment of the welding sensor 30 by means of the switch 18, which is an attachment/detachment sensor, the attachment/detachment of the welding sensor 30 may be detected on the basis of whether or not the sensor control cable 60 is connected or whether the output from the welding sensor 30 is input to the robot control device 3. Also, in the case in which installing of the welding sensor 30 is detected, the sensor attaching surface 6*a* to which the welding sensor 30 is installed may be specified on the basis of the information about force detected by the force sensor 10.

In addition, in this embodiment, the robot 2 to which the welding torch 100 for arc welding is attached has been described as an example; however, the present invention may be applied to the robot 2 to which another tool, such as a laser welding tool or a sealing tool, is attached. In addition, the welding sensor 30 that detects a welding work line has been described as an example of an additional device that is attached to the distal end of the wrist 4 of the robot 2 in an attachable/detachable manner; however, alternatively, the present invention may be applied to a case in which another arbitrary additional device is installed. For example, the additional device may be a sensor that detects a processing work line which is a trajectory for performing sealing.

In addition, in order to prevent the operator from coming into contact with the welding sensor 30 by mistake, a guard member that surrounds the welding sensor 30 may be installed, as indicated by two-dot chain lines in FIGS. 1 and 2. As the guard member, for example, a metal box-like cover or a protector consisting of a metal pipe material that is secured to the tool bracket 6 and that surrounds outer peripheral surfaces of the welding sensor 30 other than the laser emission surface may be employed.

In addition, in this embodiment, the case in which the sensor attaching surfaces 6*a* for attaching the welding sensor 30 are provided at three locations in the tool bracket 6 has been described as an example; however, the sensor attaching surfaces 6*a* may be provided in an arbitrary number equal to or greater than one. In the case of one location, it suffices to detect only whether or not the welding sensor 30 is attached/detached. In addition, the forms, the shapes, and the placements of the tool bracket 6, the torch bracket 7, the handles 8 and 9, the lead-through switch 13, the pressing button switches 14 and 15, etc. may be arbitrary.

In addition, although the case in which the first handle 8 and the second handle 9 are provided has been described, there may be one or no handle. In the case of no handle, the operator may directly grip the torch bracket 7, the tool bracket 6, or the wrist 4 of the robot 2 with his/her hand to push and pull the portion.

REFERENCE SIGNS LIST

1 robot system
2 robot
3 robot control device
4 wrist
6*a* sensor attaching surface (attaching surface)
10 force sensor
18 switch (attachment/detachment sensor)
40 welding sensor (additional device)

The invention claimed is:

1. A robot control device capable of controlling a robot according to a lead-through control in which an orientation of the robot is varied in accordance with magnitude and a direction of force detected by a force sensor provided in the robot, wherein the robot control device:
- identifies a first state in which an additional device is installed at a distal end of a wrist of the robot, and a second state in which the additional device is not installed; and
- switches a load setting of the robot when the lead-through control is executed in the first and second states.

2. The robot control device according to claim 1, wherein the robot control device identifies the first state and the second state on a basis of an output from an attachment/detachment sensor provided on an attaching surface of the additional device at the distal end of the wrist.

3. The robot control device according to claim 2, wherein the robot control device:
- identifies an attaching position of the additional device in the first state on a basis of an output from the attachment/detachment sensor provided on each of a plurality of the attaching surfaces; and
- switches the load setting of the robot when the lead-through control is executed in the first state in accordance with the attaching position.

4. The robot control device according to claim 1, wherein the robot control device identifies the first state and the second state on a basis of information about force detected by the force sensor in the first state and information about force detected by the force sensor in the second state.

5. The robot control device according to claim 4, wherein the robot control device:
- identifies the attaching position of the additional device in the first state on the basis of the information about the force detected by the force sensor in the first state and the information about the force detected by the force sensor in the second state; and
- switches the load setting of the robot when the lead-through control is executed in the first state in accordance with the attaching position.

6. A robot system comprising:
- the robot control device according to claim 1; and the robot having the force sensor.

* * * * *